United States Patent
Sharafyan et al.

(10) Patent No.: US 11,929,096 B1
(45) Date of Patent: Mar. 12, 2024

(54) CONTENT-BASED ADAPTIVE SPEED PLAYBACK

(71) Applicant: INTED INC., Berkeley, CA (US)

(72) Inventors: Mnatsakan Sharafyan, Yerevan (AM); Gor Matevosyan, Yerevan (AM); Levon Khachatryan, Yerevan (AM)

(73) Assignee: SAIMA, INC., Berkeley, CA (US)

( * ) Notice: Subject to any disclaimer, the term of this patent is extended or adjusted under 35 U.S.C. 154(b) by 0 days.

(21) Appl. No.: 18/128,255

(22) Filed: Mar. 30, 2023

Related U.S. Application Data

(60) Provisional application No. 63/405,790, filed on Sep. 12, 2022.

(51) Int. Cl.
  *G11B 27/00* (2006.01)
  *G10L 15/08* (2006.01)
(52) U.S. Cl.
  CPC ............ *G11B 27/005* (2013.01); *G10L 15/08* (2013.01)
(58) Field of Classification Search
  CPC ............................. G11B 27/005; G10L 15/08
  See application file for complete search history.

(56) References Cited

U.S. PATENT DOCUMENTS

| | | | |
|---|---|---|---|
| 2012/0062732 A1* | 3/2012 | Marman | G08B 13/19682 348/142 |
| 2017/0064244 A1* | 3/2017 | Abou Mahmoud | H04N 5/7605 |
| 2019/0079918 A1* | 3/2019 | Thörn | G10L 15/05 |
| 2020/0043511 A1* | 2/2020 | Raikar | G10L 21/055 |
| 2020/0301965 A1* | 9/2020 | Cormican | G06F 3/04883 |

\* cited by examiner

*Primary Examiner* — Girumsew Wendmagegn
(74) *Attorney, Agent, or Firm* — ARLUYS IP, P.C.

(57) ABSTRACT

Techniques are described for automatically adaptive playback speed for media playback. In an embodiment, media data is received, which is associated with multimedia to be rendered at an original capture speed on a multimedia player on a computing device. A content density index value for a particular portion of the multimedia is determined, the content density index value representing a rate of content within the particular portion that a user of the multimedia player has to comprehend. Based on the content density index value for the particular portion, a new speed is determined for rendering the portion of the multimedia. The new speed may be stored associated with the portion of the multimedia for rendering the portion of the multimedia at the new speed that is different from the original speed.

18 Claims, 6 Drawing Sheets

US 11,929,096 B1

CONTENT-BASED ADAPTIVE SPEED PLAYBACK

BENEFIT CLAIM

This application claims the benefit under 35 U.S.C. § 119(e) of provisional application 63/405,790, filed Sep. 12, 2022, the entire contents of which are hereby incorporated by reference for all purposes as if fully set forth herein.

FIELD OF THE TECHNOLOGY

The present invention relates to the field of digital media, in particular to content-based adaptive speed playback.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Various audio and video media items contain various densities of information spread across the duration of the media. Especially if the media has not been edited for content, the media may contain repetitive information, no or low informational content at some durations, as well as very informationally dense portions. Such uneven distribution of content in media is especially evident in the live capture type of media. For example, when the media is a recording of a live lecture, talk, or interview, the media may contain long durations of no substantive content as the speaker is perhaps contemplating her thoughts to express or is talking at a slower pace than a consumer can comprehend. While at the same time, once the speaker is expressing her thoughts, the media may contain a dense substance that may be hard to comprehend for the consumer of the media when played back at the speed of the capture.

Additionally, there may be much audio/visual environment captured in the media that may not be substantive (e.g., the screeching of chairs, interjections, pauses in speech, etc.). At the same time, there may also be visual (video) media capture that has high-value content. For example, in the lecture environment, the media may have captured the speaker reproducing her thoughts on a whiteboard. The frames of the video may substantially be the same, yet the small change in the depiction (the additional writing in the frame) has high-value content for the user.

Additionally, the comprehension rate of media content for users varies as well. Even if the content density of media content stays the same across a particular portion, different users may comprehend the information at different rates. One user may comprehend the information faster because such a user is familiar with the general subject matter of the content, while another user may have a slow pace of comprehension because of unfamiliarity. Apart from familiarity, many other factors influence the rate of comprehension among users, such as natural differences in cognitive capacities among humans, the presence of cognitive disease, the ability to ignore accents, and a predisposition to a particular media type (audio/video/reading). Thus, even for static content density, different users may require a speed up or speed down of the playback of media content.

One approach to address the variable comprehension rate or variable content density in media is for the user to manually adjust the speed of the playback based on her own analysis of the media. Many media players have the capability to playback the media at different fixed speeds. When sped up or slowed down, the playback speed changes for the whole content at the same pace without considering the speaker's natural speedups and slowdowns of speech delivery.

Manually adjusting the media playback speed is not only inconvenient for the user but may also yield repeated playbacks of the same portion of the media. The user has no apriori knowledge about the density of the content of the next portion of the media. Accordingly, based on the current comprehension rate for the media, the user has to make an assumption about a future portion of the media and adjust the speed accordingly. If the assumption of the speed up or slow down is wrong, then the user would have to rewind the media to the initial point and play it back again, changing the speed accordingly. Such replays waste computing resources on the repeated replays while also wasting the user's time.

Media may be analyzed ahead of the playback, and such approaches for media analysis exist. However, those approaches are for the determination of the compression for media encoding for streaming: to transfer and playback media at the most optimal size for network and quality. Yet, when an encoded media is played back, it is of the same exact duration (and thus the same content rate) as before the encoding.

Furthermore, the encoding techniques treat any information within the media as having the same content value. For example, for the portion of the media capturing the speaker writing on the board, which has high content value as described above, the encoding techniques would provide heavy compression due to the lack of changes between video frames. On the other hand, the speaker walking across the stage while the audience is clapping generates a large informational change in the frames while having a small value content-wise.

BRIEF DESCRIPTION OF THE DRAWINGS

In the drawings of certain embodiments in which like reference numerals refer to corresponding parts throughout the figures.

DETAILED DESCRIPTION

Figure 1:
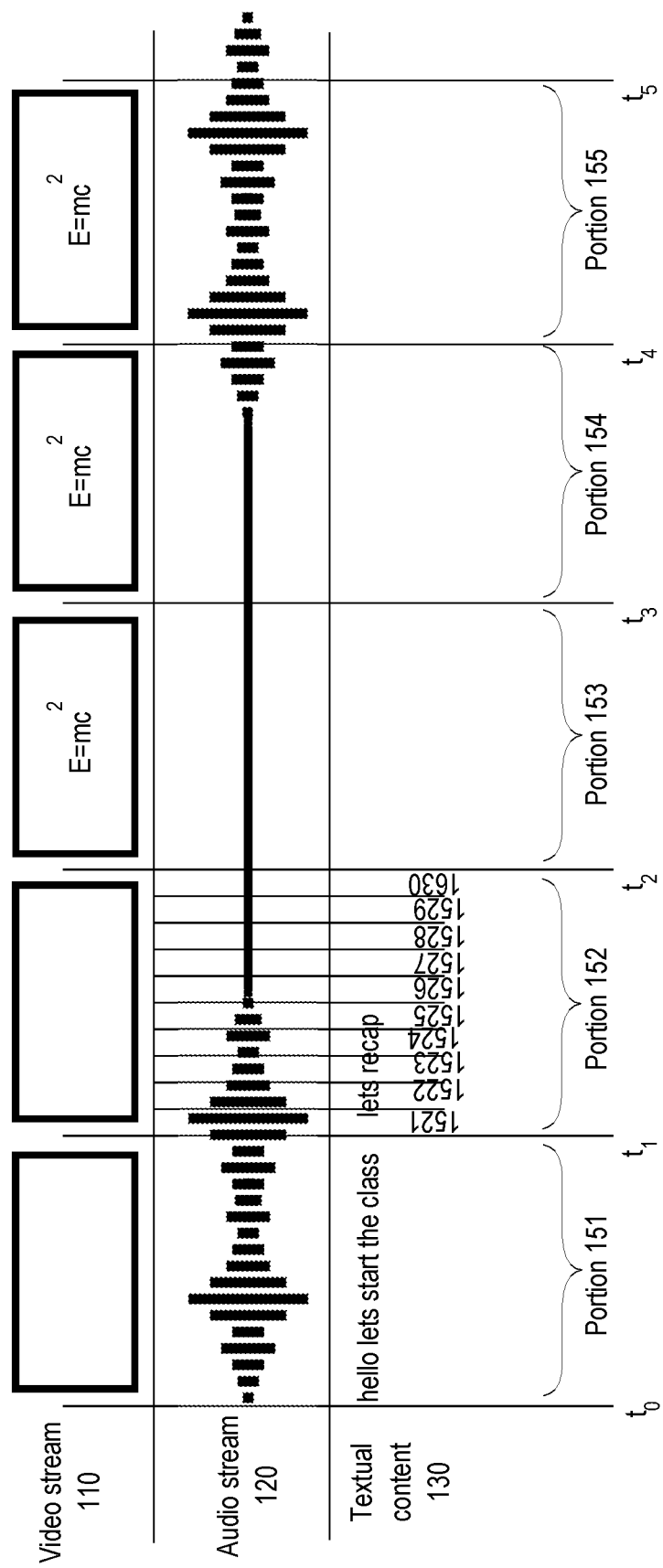
FIG. 1 is a diagram that depicts a sample media and its content received and/or generated by a system, in an embodiment.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe automatically adaptive playback speed techniques for media. The techniques further include normalizing the playback speed of media to the rate at which the user may fully comprehend the information in the media. The computer system that receives the media determines the media content density index value for portion(s) of the media. The term "content media density (index value)" refers herein to the rate of information provided when the media or a portion thereof is reproduced. Non-limiting examples for units measuring a content media density index value include word-per-minute, syllable-per-minute, byte-per-minute or one or more functions thereof.

In an embodiment, the media player may be configured to a desired content density comprehension index value for media playback. The term "desired content density comprehension (index value)" refers herein to the content density index value at which the media player is requested to reproduce the media. Stated differently, the desired content density comprehension index value represents the desired rate of information at which the media is to be reproduced. The desired content density comprehension index value may be configured specifically for each user and may depend on a variety of factors of a user, such as a language barrier, the presence of cognitive disease, predisposition to a particular media type (audio/video/reading), and/or individual abilities.

Therefore, while the media may be reproduced at different content media density index values using techniques described herein, human cognition may have limited ability to process the reproduced information. The techniques described herein include speeding up/down the playback of the portion(s) of media to match the desired content density comprehension index value of the user.

Additionally, by using these techniques, the video and/or audio streaming platforms may reduce the time spent by users for apprehending the same amount of information without experiencing distractions. As described above, the fixed playback speed may cause cognitive overload and/or disengagement by the user because the media playback may be too fast (thus, the user misses important content) or too slow (causing disengagement with the user).

The cognitive comprehension of the user depends on the changes in the rate of speech, long pauses, interjections, and other media content density parameters. The techniques described herein may optimize the duration of the video and audio media by applying optimized playback speed for each time interval (e.g., 10 ms, 100 ms, etc.) to the user's desired content density comprehension index value and/or minimizing the duration of the media playback.

In an embodiment, one or more media content density parameters are used to determine the speed of the playback for a portion of the media. The system analyzes several inputs, such as speech data, to determine speech properties (e.g., density, pace, rate, tempo) and context properties (e.g., the importance of each sentence in the given context, accent, familiarity). Additionally, or alternatively, the system may analyze the video data (e.g., actions in the video) to determine visual properties. The algorithm maintains the optimal rate of information delivery by controlling the speed for any video and audio content at any given period of time. In an embodiment, the range of desired speed (e.g., minimum and maximum thresholds, desired fixed speed as an average speed for the audio/video media) may be configurable, predefined or computed.

In one embodiment, in parallel or before a request for rendering media is received, the process retrieves the media or a copy thereof. For example, the media or a copy thereof may be retrieved in response to the user requests for the landing page of media (containing a link for media) and before any media is requested for playback. Accordingly, the media may be processed ahead of the playback, and the appropriate speed for the portion(s) of the media determined for the adaptive playback of the media. Such apriori request/download/processing of the media avoids any lag or delay when the playback is requested. Alternatively, a copy of the media may be received in response to the request to render the media.

In an embodiment, the copy requested by the process to download may be of a lesser size (e.g., higher compression or lower resolution). Because the obtained media is of a lesser size in such an embodiment, the system may download the copy from the source library much quicker than the original media, which may be downloaded and rendered for the user in parallel. The future (not yet reproduced) portions of the media are processed to determine the adaptive playback speed for the portions before the media player reaches such portions for playback. Accordingly, the system seamlessly switches to adaptive playback speed in real time based on the pre-downloaded media content.

For audio media (e.g., the audio stream of audio/video media), the system retrieves the textual data transcribing the audio, in one embodiment. Alternatively, the system may convert the audio media to text and store the text in the textual data.

In one embodiment, the textual data is used for representing the context of the audio media stream (or a portion thereof) for a user. For example, the textual data may be used to determine the textual complexity of content portions (e.g., a sentence or paragraph) relative to each other (e.g., text ranking) or in absolute (e.g., text difficulty, topic modeling). Once each content portion's content complexity parameter is determined, the appropriate speed may be selected based on the context parameter value. For the higher complexity, the content portion is associated with a lower speed, and for the lower complexity, the content portion is associated with a higher speed.

In an embodiment, speech density is determined based on digital signal processing (DSP) and speech processing algorithms like voice activity detection (VAD) and automation speech recognition (ASR). When no speech is detected for a portion in the audio media, a lower density value may be associated with that portion. DSP, VAD, and ACR may use Fast Fourier transform to convert the audio into the frequency domain and filter (machine learning (ML) or non-ML) only the human speech spectrum for the portion. When no speech is detected in the spectrum associated with human speech, the portion may be associated with a lower speed density parameter value. If the portion is already associated with a particular speech density value, the portion's particular speed is adjusted accordingly.

In one embodiment, the approaches described herein may determine media content density index value for each time portion and adjust playback speed $s_i$ for each time portion $t_i$ (where $s_i=[s_i, \ldots, s_n]$ and $t_i=[t_i, \ldots, t_n]$) to match the configured/desired content density comprehension index value for the media player.

Various machine learning (ML) and non-machine learning algorithms/techniques may be used to evaluate the following parameters for determining media content density index value: (a) speech density parameter, (b) context density parameter, and/or (d) visual significance parameter.

a) Speech density—the term "speech density" refers herein to a lexical unit rate in an audio stream or a portion thereof. The speech density may be determined using ML and non-ML techniques, which may include detections of pauses and/or interjections in the audio stream media.

c) Context density—the term "context density" refers herein to the degree of complexity of the content when comprehended by a user. The content density may be a numerical representation of the familiarity of the context to the user, both in substance (content) and reproduction (accents), including the importance of a content portion (e.g., sentence, paragraph) relative to other portions of content in the media.

d) Visual significance—detections of communication actions of the speaker such as speaking, writing, etc., writing speed, and other useful information Functional Overview A computer system may receive an audio and/or audio-video media stream and perform processing to determine the content density index value for the media and/or one or more portions thereof. FIG. 1 is a diagram depicting a sample media and its content received by a system, in an embodiment. Media 100 is received by the system and may include one or more stream tracks, such as video stream 110 and audio stream 120. Additionally, the system may receive textual content 130. A non-limiting example of an audio stream is audio-decoded data in pulse code modulation (PCM) data format. A non-limiting example of textual content is video track text (VTT) data. In another embodiment, textual content 130 may be generated from one or more audio tracks, such as audio stream 120.

The system analyzes the received track(s) of one or more media portions of the received media to determine the content density index value for the respective portions. Based at least in part on the content density index value, the system determines the multiple(s) of the playback speed measurement relative to the speed of capture (e.g., 1.1 or 0.9, in which 1.0 is the speed of capture of the media) for the one or more portions of the media. Additionally, the playback speed may be based on desired content density comprehension of the user consuming the media.

Extracting Textual Content from Audio Media

Figure 2:
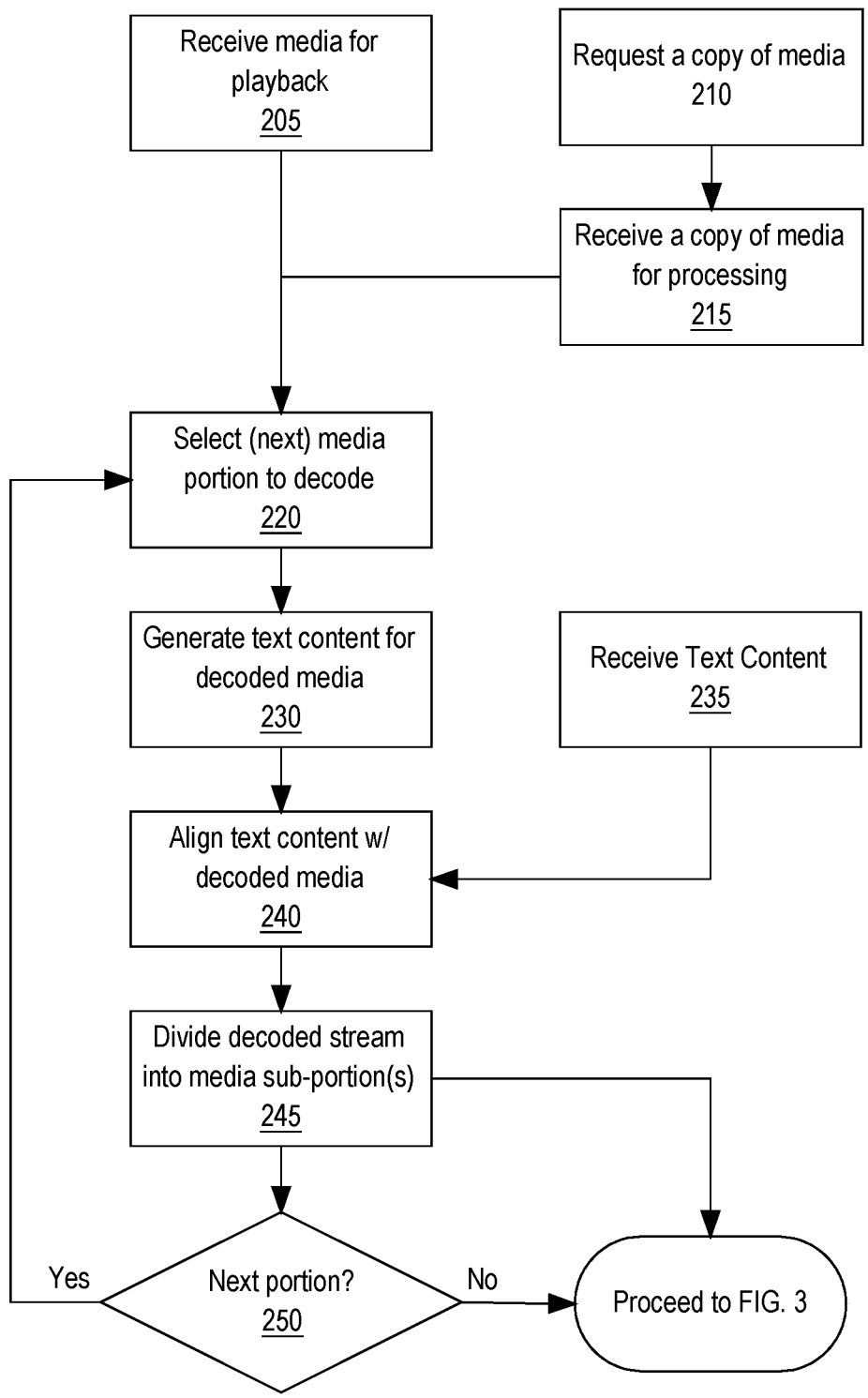
FIG. 2 is a block diagram that depicts a process for processing audio media, in an embodiment.

FIG. 2 is a block diagram that depicts a process for processing audio media, in an embodiment. The process may receive the media in its original resolution (original compression/encoding) for playback on a media player of a user at step 205. The audio media received may be the audio stream of the audio/video media received, for example, audio stream 120 of media 100 of FIG. 1. When streaming/downloading, at step 205, the process may receive temporally arranged portion(s) and process those portions according to the techniques described herein.

Additionally or alternatively, the process may request a copy of media at step 210 before receiving the media for playback at step 205 or in response to the request to receive the media for playback at step 205. The process may detect that a webpage or an application UI contains a link to the media and request the streaming/download of a copy of the media at step 210. The process receives the media or continuously receives portion(s) of the media at step 215.

Because the copy of the media is requested and/or starts streaming/downloading at steps 210-215 before any playback of the media is requested, one or more portions of the media may be processed according to the techniques described herein and, thus, ready for adaptive playback before the actual playback of the media has been initiated.

In an embodiment, at step 215, the system receives the lesser memory size media for processing. Non-limiting examples of lesser-memory size media are lower-resolution media such as a high-compression and/or low-resolution encoding media. For example, the received lesser-memory media may contain only audio, and the received audio media may further have lesser bytes-per-second quality than the original media soundtrack. However, the exact format of audio media is not critical to the techniques described herein. For example, the techniques herein may be performed on the original media received at step 205.

At step 220, the process selects a portion of the media for generating the corresponding text content of the portion and decodes the portion of the media into a decoded stream, if necessary. For example, portions 151-155 are media portions of media 100, and each media portion's decoded audio portion is selected for processing to generate the corresponding textual content portion of textual content 130.

At step 230, the decoded audio stream may be converted to the corresponding textual content. For example, the step may include performing ASR (Automatic Speech Recognition) to extract textual content data from the audio stream. Continuing with example media 100 in FIG. 1, portion 151 of audio stream 120 is converted, and the "hello lets start the class" text is generated in textual content 130.

Alternatively or additionally, the process may receive the textual content as metadata of the media at step 235. Many online media services, such as YouTube®, have an interface for requesting and downloading textual content (caption services) of the media. Upon request, the textual content may be received by the system from the online media service.

At step 240, the textual content data may be aligned with the media (audio stream) using time markers (e.g., timestamps). If no time markers are provided with the textual content (e.g., the received textual content from the online media service), the system performs Forced Aligner (e.g., MFA, Montreal Forced Aligner) by accessing textual content data and the corresponding audio. The system generates the time markers for the textual content data by matching the textual content portions to the corresponding audio content portions, in such an embodiment. Accordingly, each lexical unit (e.g., syllable, word n-gram, word, sentence, paragraph) may be marked by a start and end time marker, the markers representing the time stamps from the start of the media.

Figure 3:
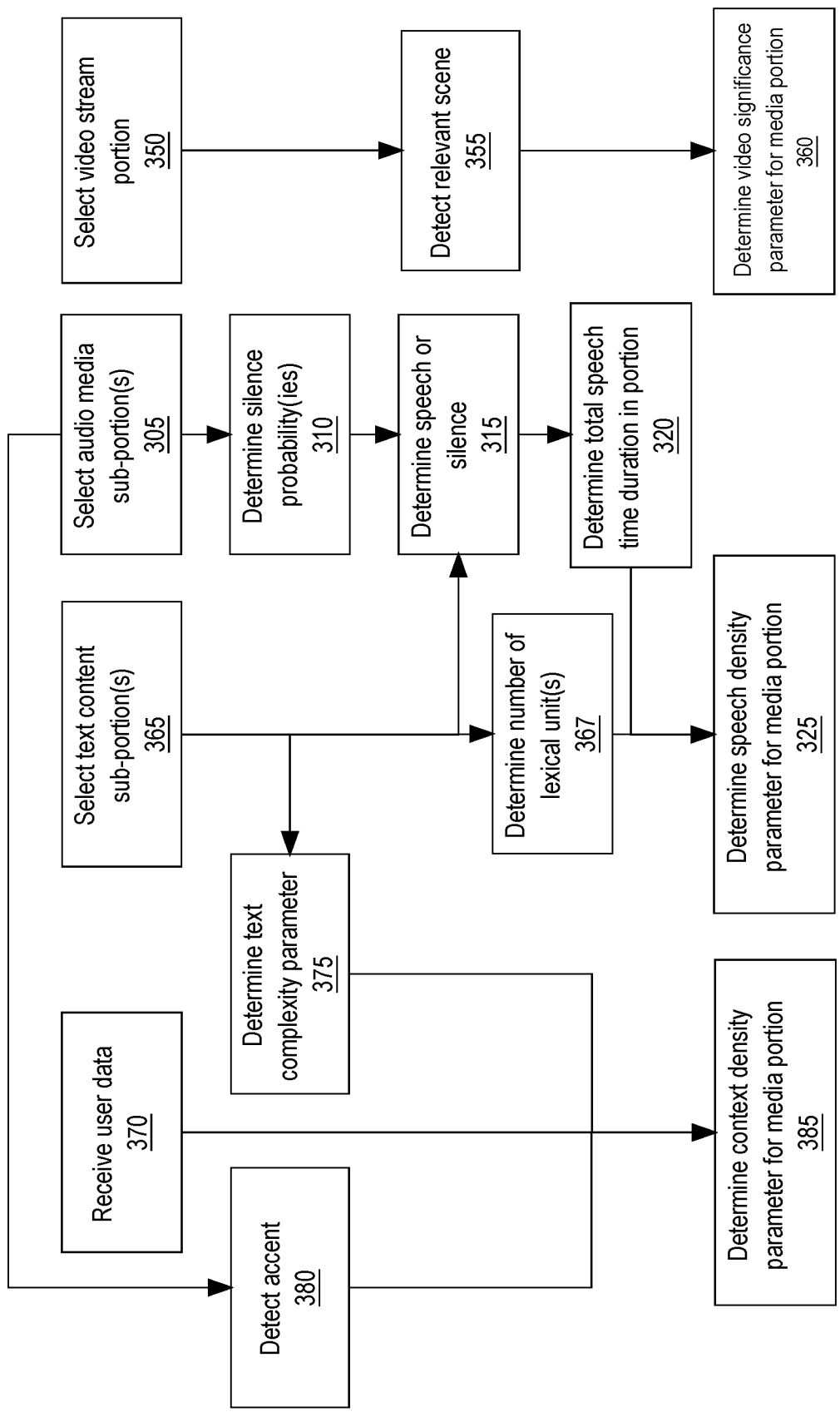
FIG. 3 is a block diagram depicting a process for determining one or more content density index parameters, in one or more embodiments.

At step 245, the media portion may be divided into sub-portions for further processing using techniques described in FIG. 3. Although a sub-portion may be as long as the portion itself and a portion may be as long as the media itself, a typical sub-portion is a collection of frames for 10 or 100 milliseconds of audio. For example, $x=x_1, \ldots, x_n$ are sub-portions of a media portion of the decoded audio stream where xi is the i-th sample sub-portion of the audio. The corresponding textual content of each sub-portion may be denoted $t=t_1 \ldots t_k$. For example, continuing with FIG. 1, portion 152 of audio stream 120 is divided into sub-portions 1521-1630. Similarly, using the time markers to match the sub-portions of audio stream 120 to textual content 130, the process divides textual content 130 into corresponding sub-portions 1521-1630 of textual content 130.

At step 250, the process proceeds to the next portion of the media if one exists. If not, the process proceeds to FIG. 3 for determining media density index parameters.

Detecting Silence/Speech

FIG. 3 is a block diagram depicting a process for determining one or more content density index parameters, in one or more embodiments. At step 305, the process selects sub-portion(s) of the audio media for processing and detecting speech or silence in such sub-portions. In an embodiment, at step 310, for each sub-portion, the process determines the speech probability, which is the probability that the sub-portion contains only human speech. In an alternative embodiment, the process may determine the silence probability, which is the probability that the sub-portion contains only silence and, thus, no speech. The process generates a probability value for whether the speech (voice) is present in the corresponding portion. $p=p_1, \ldots, p_n$ is the probability of voice for each sub-portion in the portion of media. The Voice Activity Detector (VAD) may be used to determine the probability values. Thus, for portion 152 of FIG. 1, $p_{1521}$-$p_{1530}$ are generated that indicate each sub-portions likelihood of containing voice.

Alternatively or additionally, at step 315, the corresponding textual content for the sub-portion(s) are retrieved at step 365. The corresponding textual content may identify whether the sub-portion(s) contain silence or speech. The corresponding textual content of the sub-portion may be any part of the textual content that is timestamped to a time duration that includes the selected sub-portion(s). Stated differently, the corresponding textual content timewise corresponds to the selected sup-portion(s) but may include more textual content from temporally adjacent sub-portion, in an embodiment.

At step 315, the speech probability(ies) and the corresponding textual content, alone or in combination, are used to determine which sub-portion(s) of the selected portion, if any, contain speech. In one embodiment, speech may be detected in two cases: 1) if there is a text for the corresponding sub-portion(s), or 2) if the speech probability in a period (one or more sub-portions) is higher than a threshold (predefined, configured, or computed), which is also a hyperparameter of the algorithm. For example, if the speech probability is above 0.5 for the sub-portion or the corresponding textual content is non-empty, then the sub-portion contains speech; otherwise, the sub-portion contains silence.

Continuing with the example of media 100 in FIG. 1, when evaluating the corresponding textual content for sub-portion 1522, the textual content within time stamps of sub-portions 1521-1523 may be selected from textual content 130. Such corresponding textual content from textual content 130 is determined to contain "lets re" textual content. Accordingly, the process may determine that sub-portion 1522 contains speech based on non-empty textual content. Additionally or alternatively, the sub-portion 1522 may be provided as input into a VAD algorithm to determine the probability of sub-portion 1522 exceeding a threshold for containing voice.

On the other hand, when sub-portion 1527 is selected, the process may determine that corresponding textual content (e.g., corresponding to sub-portions 1526-1528) is empty in textual content 130. The process may further consider the speech probability of 1527 for determining whether sub-portion 1527 is silent. If such a probability is calculated and determined to be above the threshold, then the process may still qualify sub-portion 1527 as having speech. Otherwise, if the calculated probability is determined to be below the threshold, the process confirms that sub-portion 1527 is indeed silent.

Speech Density

To calculate the speech density, a particular portion that includes one or more sub-portions of textual content is selected at step 365. At step 367, the process determines the count of lexical units in the selected textual content. The process identifies each lexical unit and accumulates the count of the lexical units in the corresponding portion of the textual content. Based on the count of the lexical units and the total duration of speech time, the process calculates the speech density at step 325. For example, the process may divide the count of the lexical units by the total duration of the speech.

In another embodiment, the process may disregard silent sub-portion(s) of the selected portion or may only use the speech-detected sub-portion(s) of the selected portion. For such an embodiment, for each sub-portion of the selected portion, the process performs steps 305 to 315 to determine which of the sub-portion(s) contain speech, if any, as described above. At step 320, the total duration of speech time in the portion is determined based on the removal of the silent sub-portion durations (or accumulating only speech sub-portions).

Continuing with the example of media 100 in FIG. 1, the process may select portion 152 having sub-portions 1521-1530 of 0.2 seconds each for calculating the speech density for the portion. The process determines that there are three syllables (as an example of a lexical unit) in portion 152 of textual content 130. The process may then determine that sub-portions 1521-1525 contain speech, while sub-portions 1526-1530 are silent sub-portions. Accordingly, the speech density for portion 152 in syllables per second is calculated to be 3/(5*0.2)=3 syllables per second.

Alternatively, for a portion of media, the speech probabilities for each sub-portion of the portion at step 315 are calculated. At step 325, the weighted average of the probabilities is calculated (e.g., using a gaussian kernel with predefined variance as a hyperparameter). The calculated weighted average is the speech density in the given portion. The speech density, $sd=sd_1, \ldots sd_t$, where $$1 = \left\lceil \frac{n}{N} \right\rceil,$$

where N is the number of sub-portions in the portion, and ceiling brackets refer to the ceiling function, which maps the value in the bracket to the least integer greater than or equal to that value.

Context Density

Context density represents the degree of complexity of the content when comprehended by a user. Accordingly, the context density, in addition to the media content, depends also on user properties. At step 370, the process may receive user data to determine context density. Non-limiting examples of user data may be numerical representations for the familiarity of the user with the topic of the media content (user content familiarity) user's browsing/playback history from which a familiarity index value may be derived. At step

385, the determined familiarity of the user is used to determine the context density parameter value for the media portion, in an embodiment.

Additionally, the audio stream containing portions that have accented speech may also increase the difficulty of comprehension by the user. Accordingly, the sub-portion(s) of the audio media stream received at step 305 are analyzed to determine whether the audio stream contains any speech with an accent at step 380. The existence of the accent affects context density determination performed at step 385. If an accent is detected, the context density parameter value for the portion may reflect a greater density of context. For example, the selected sub-portion(s) may be provided to the machine learning engine trained for the detection of accent(s). The output of the machine learning engine is used to determine context density at step 385, in an embodiment.

Additionally or alternatively, at step 375, the text complexity parameter for the selected textual content at step 365 may be determined.

In an embodiment, the process uses text difficulty determination techniques to determine the text complexity parameter for the selected textual content. Text difficulty techniques refer to a set of AI techniques aiming to determine the complexity of a text by analyzing various aspects of the textual content, such as vocabulary, sentence structure and length, cohesion and coherence etc. The resulting difficulty score provides an objective measure of the text's level of difficulty and helps determine whether a text is appropriate for a particular user, considering the requested content density index.

Additionally or alternatively, the process uses topic modeling techniques to determine the text complexity parameter for the selected textual content. Topic modeling is a machine learning technique aiming to identify the latent topics present in the textual content, even if such topic(s) are not explicitly mentioned. The algorithm analyzes the words and phrases used in the texts and looks for patterns and clusters of words that tend to appear together.

Additionally or alternatively, the process uses text ranking techniques to determine the text complexity parameter for the selected textual content. The text ranking techniques yield the importance of each content portion (e.g., word n-grams, sentence, or paragraph) in a given context, in an embodiment. For example, the more important content portion may be definitions, statements, and one-time appeared topic relation sentences. On the other hand, examples of less important content portions may be off-topic discussions, repeated ideas, etc. The text rank may be calculated using a text-rank algorithm with glove word embeddings to analyze the importance of each sentence in the given context; although the techniques are not limited to this particular algorithm, any other text-ranking algorithm may be used.

In an embodiment, assume $r=r_1, \ldots r_k$ are the ranks for each content portion (e.g., sentence) in the textual data content (e.g., captions). Then, the formula is used to calculate the text rank-based parameter value for each content portion. For example, the following formula may be used for calculating the ith content portion $text\_rank\_paramter_i = 1/r_i$.

At step 385, the determined text complexity parameter of the selected textual content is used to determine the context density parameter value for the media portion, in an embodiment.

Alternatively, two or more of the text complexity parameter (e.g., text difficulty, topic modeling, text ranking), familiarity, or accent detection parameters may be used to determine the context density parameter value. In one embodiment, the context density parameter may be used to adjust the speech density value up or down when determining the content density index value.

Video Significance

Additionally or alternatively, the significance of the video stream may be assessed to determine whether the video stream contains any content for comprehension by the user. At step 350, the process may receive video frames from the video stream that correspond to the audio portion to determine the video relevance to the comprehension by the user, in an embodiment. For example, if there is silence, but the lecturer is writing something on the board, such a writing may be necessary for the comprehension of the media and may have a high value of significance.

To detect the relevant video frames, at step 355, computer vision techniques may be used. If the computer vision process detects a relevant scene (e.g., a whiteboard with writing or a speaker using objects while performing an experiment), the process may assign a higher video significance value than otherwise at step 360. Accordingly, if such detection has occurred, especially for a speech-free (silent) portion(s) of the audio stream, the process may assign a high content density value to the portion than otherwise to ensure that the portion(s) are not skipped.

Continuing with example media 100 in FIG. 1, video stream 110 may contain the frames of a whiteboard being by the speaker. The process may use action detection techniques based on Deep Learning to detect such a scene. The process calculates the corresponding high video significance score. Although portion 153 is speech-free and thus should have a low content density index value, due to the detected visual significance for the corresponding video frames, portion 153 is assigned to a high content density index and is not skipped.

Content Density Index

The content density index may be calculated based on one or more of the speech density, content density and video significance parameters. In an embodiment, the content density index is measured in the playback speed multiples. According to such an embodiment, the calculated content density index may be provided to the media player for adjusting the playback speed of the media.

In another embodiment, the content density index does not represent the speed of the playback, and therefore an additional step is performed to convert the content density index into the playback speed multiple for the media. As a non-limiting example, the content density index may be an opaque metric, which may be compared to a predefined/pre-configured/received index value for a media portion to determine the multiple of the playback speed for the media player to adjust to for the portion.

Figure 4:
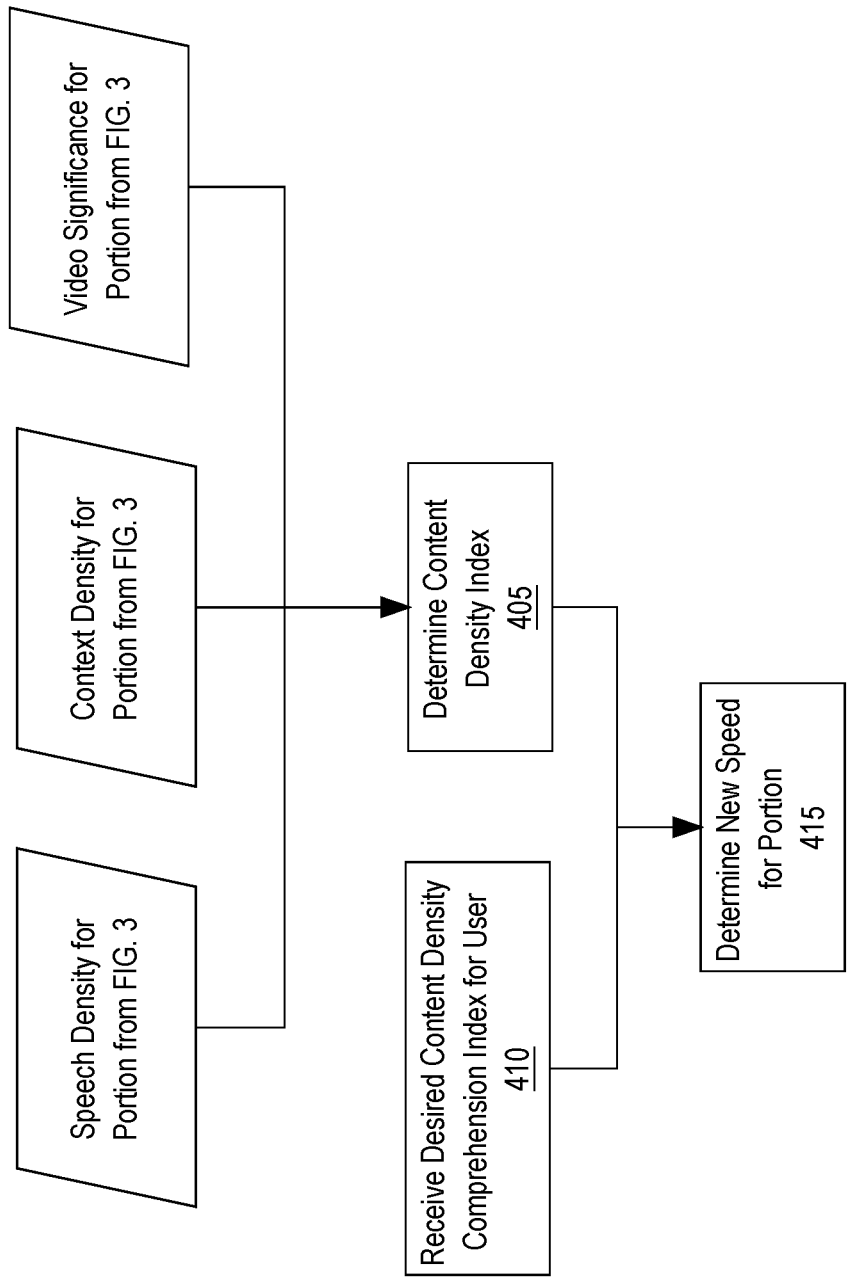
FIG. 4 is a block diagram that depicts the process for determining a new adaptive speed for a portion of media, in an embodiment.

FIG. 4 is a block diagram that depicts the process for determining a new adaptive speed for a portion of media, in an embodiment. At step 405, the content density index value is calculated using the speech density parameter, content density parameter and/or video significance parameter. The content density index value for a portion may be calculated using the following formula:

$$content\_density = f(speech\_density, context\_density, video\_significance).$$

For example, f may be a weighted average of any combination of the three parameters.

Such a content density index value may be for a media portion for which the speech density, context density, and/or video significance parameters are determined. As discussed above, the media may contain one or more media portions for which the parameters are calculated using techniques discussed herein.

At step 410, the process receives a desired content density comprehension index for a user, in an embodiment. Alternatively, the desired content density comprehension index is pre-configured for any user. Accordingly, the adaptive playback speed is based only on the determined content density index values for the corresponding portions of the media.

At step 415, the new adaptive playback speed for the media portion is calculated based on the comparison between the desired content density comprehension index for the user and the content density index for the media portion.

Additionally or alternatively, the desired content density index is configured for each portion to adjust the playback speed based on a particular function. In one embodiment, a maximum desired content density index value and/or a minimum desired density index value are received. The minimum desired density index value may be the desired content density comprehension index received for a user. The process generates a corresponding set of the desired content density index values for each portion of the media that are above the corresponding content density index (as determined at step 405).

Such a generated set of content density index values increases for each temporally adjacent portion of the media until it reaches the maximum desired content density comprehension index value. Accordingly, the process generates a set of adaptive playback speeds for each portion of the media based on the corresponding desired content comprehension density index value for that portion and the content density index value for that portion at step 415. For example, multimedia on a multimedia player may be rendered at an original speed, while the techniques described herein determine an increment speed by which to increase the original speed to a new speed at each consecutive portion of the media. The new speed is capped to the maximum speed, and the rendering, once it reaches the maximum speed, is not increased any further.

In an embodiment, the adaptive media playback speed may be configured with minimum and maximum thresholds (e.g., 1.25 and 1.75). Accordingly, even if the adaptive playback speed is above or below the corresponding threshold, the process performs the feedback at the respective maximum or minimum threshold speeds at step 415.

The generated adaptive playback speeds at step 415 may be stored in association with the corresponding portion of the media. When the media player plays back the media, at each portion, the media player retrieves the associated adaptive speed and modifies the speed of playback to the retrieved speed. Thereby, the media player performs a playback at an adaptive speed.

One or more of the steps described in FIGS. 2-4 may be omitted, repeated, and/or performed in a different order. Accordingly, the specific arrangement of steps shown and described in FIGS. 2-4 should not be construed as limiting the scope of the invention.

Software Overview

Figure 5:
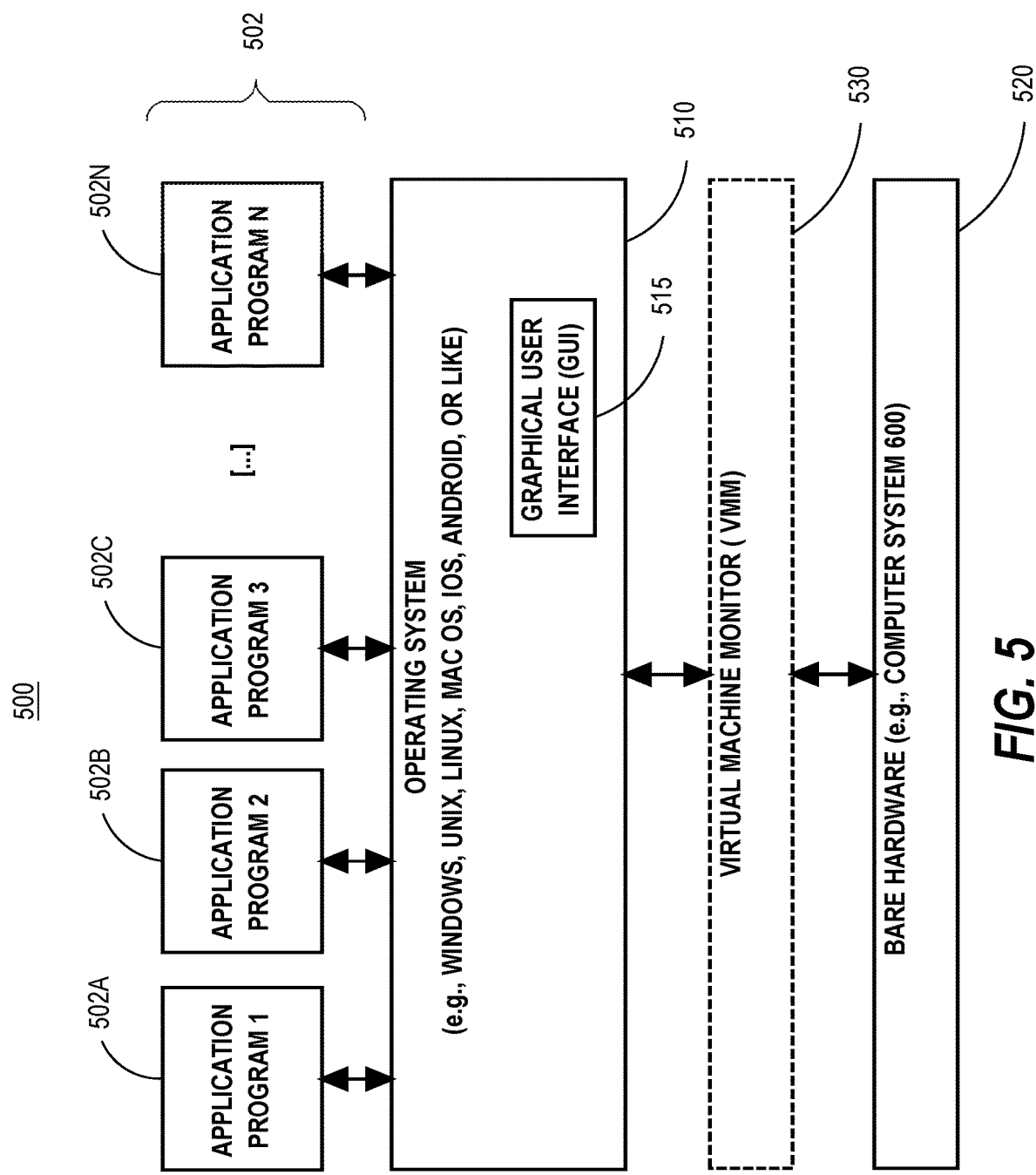
FIG. 5 is a block diagram of a basic software system, in one or more embodiments.
Figure 6:
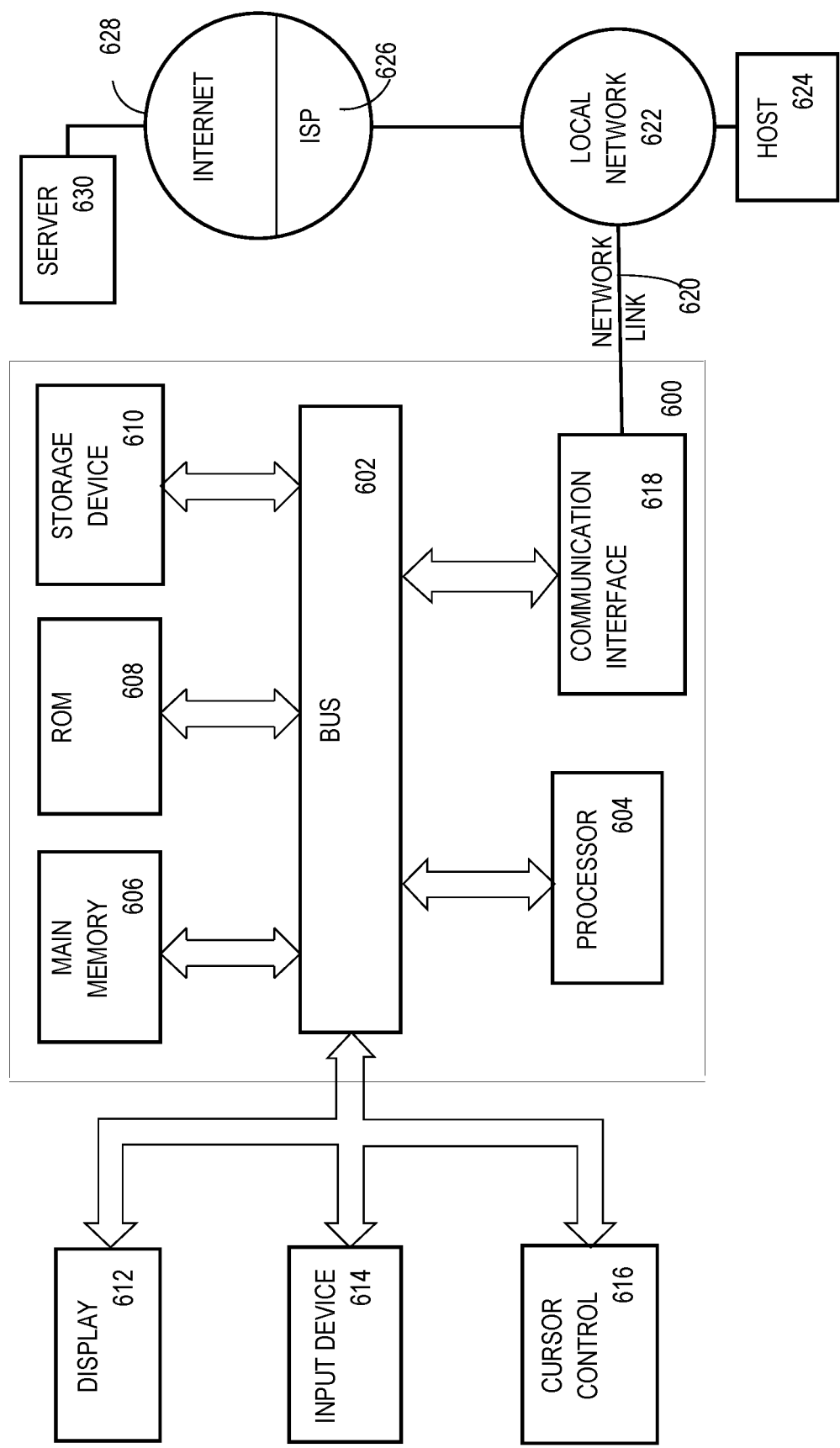
FIG. 6 is a block diagram that illustrates a computer system upon which an embodiment of the invention may be implemented.

FIG. 5 is a block diagram of a basic software system 500 that may be employed for controlling the operation of computing system 600 of FIG. 6. Software system 500 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or another online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random access memory (RAM) or another dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read-only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal, and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626, in turn, provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system.

A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method comprising: receiving media data, wherein the media data is associated with multimedia to be rendered at particular speed on a multimedia player on a computing device; determining a content density index value for a particular portion of the multimedia, the content density index value, representing a rate of content within the particular portion that a user of the multimedia player has to comprehend, at least, by determining whether each time interval period in a plurality of time interval periods of the particular portion contains speech, wherein the determining whether said each time interval period contains speech comprises: receiving voice-to-text textual data for the particular portion of the multimedia, or converting audio multimedia of the particular portion to the voice-to-text textual data, determining which respective segment of the voice-to-text textual data corresponds to said each time interval period in the plurality of time interval periods of the particular portion, based, at least in part, on existence of at least one lexical unit in the respective segment of the voice-to-text textual data that corresponds to said each time interval period, determining whether said each time interval period in the plurality of time interval periods of the particular portion contains speech, and generating one or more indications indicating one or more speech-time interval periods of the plurality of time interval periods of the particular portion as containing speech and one or more speech-free-time interval periods of the plurality of time interval periods as speech-free; receiving a desired content density comprehension index value associated with the user of the multimedia player, the desired content density comprehension index value representing a desired rate of content that the user has requested to comprehend; based, at least in part, on the content density index value for the particular portion and based, at least in part, on comparing the desired content density comprehension index value with the content density index value for the particular portion, determining a new speed for rendering at least a portion of the multimedia to match to the desired rate of content that the user has requested to comprehend; storing the new speed associated with the at least portion of the multimedia for rendering the at least portion of the multimedia at the new speed that is different from the particular speed.

2. The method of claim 1, further comprising, prior to request for rendering the at least portion of the multimedia on the multimedia player, obtaining a copy of the multimedia that includes the particular portion of the multimedia.

3. The method of claim 1, wherein determining the content density index value for the particular portion includes determining a speech density value for the particular portion, the speech density value indicating a density of lexical units within the particular portion.

4. The method of claim 3, wherein the lexical units include one or more of paragraphs, sentences, phrases, words, syllables, consonants, vowels and any portions thereof.

5. The method of claim 1, further comprising:
determining a speech density value for the particular portion based, at least in part, on a number of lexical units in the one or more speech-time interval periods.

6. The method of claim 5, wherein determining the new speed for rendering the at least portion of the multimedia is further based, at least in part, on one or more speech-free-time interval periods of the plurality of time interval periods of the particular portion.

7. A computer-implemented method comprising: receiving media data, wherein the media data is associated with multimedia to be rendered at a particular speed on a multimedia player on a computing device; determining a content density index value for a particular portion of the multimedia, the content density index value, representing a rate of content within the particular portion that a user of the multimedia player has to comprehend, at least, by determining whether each time interval period in a plurality of time interval periods of the particular portion contains speech, wherein the determining whether said each time interval period contains speech comprises: receiving voice-to-text textual data for the particular portion of the multimedia, or converting audio multimedia of the particular portion to the voice-to-text textual data, determining which respective segment of the voice-to-text textual data corresponds to each time interval period in the plurality of time interval periods of the particular portion, based, at least in part, on existence of at least one lexical unit in the respective segment of the voice-to-text textual data that corresponds to said each time interval period, determining whether said each time interval period in the plurality of time interval periods of the particular portion contains speech, and generating one or more indications indicating one or more speech-time interval periods of the plurality of time interval periods of the particular portion as containing speech and one or more speech-free-time interval periods of the plurality of time interval periods as speech-free; based, at least in part, on the content density index value for the particular portion, determining a new speed for rendering at least a portion of the multimedia; storing the new speed associated with the at least portion of the multimedia for rendering the at least portion of the multimedia at the new speed that is different from the particular speed; determining a context-based density value for the particular portion at least by determining textual complexity of the voice-to-text textual data; wherein determining the new speed for rendering the at least portion of the multimedia, is further based, at least in part, on the context-based density value.

8. The method of claim 7, further comprising: receiving user data associated with the user of the multimedia player; determining the context-based density value for the particular portion based, at least in part, on the user data.

9. The method of claim 7, further comprising: detecting a presence of one or more accents in audio media of the particular portion; determining the context-based density value for the particular portion based, at least in part, on the presence of the one or more accents.

10. A system comprising one or more processors and one or more storage media storing one or more computer programs for execution by the one or more processors, the one or more computer programs configured to perform a method comprising: receiving media data, wherein the media data is associated with multimedia to be rendered at a particular speed on a multimedia player on a computing device; determining a content density index value for a particular portion of the multimedia, the content density index value, representing a rate of content within the particular portion that a user of the multimedia player has to comprehend, at least, by determining whether each time interval period in a plurality of time interval periods of the particular portion contains speech, wherein the determining whether said each time interval period contains speech comprises: receiving voice-to-text textual data for the particular portion of the multimedia, or converting audio multimedia of the particular portion to the voice-to-text textual data, determining which respective segment of the voice-to-text textual data corresponds to said each time interval period in the plurality of time interval periods of the particular portion, based, at least in part, on existence of at least one lexical unit in the respective segment of the voice-to-text textual data that corresponds to said each time interval period, determining whether said each time interval period in the plurality of time interval periods of the particular portion contains speech, and generating one or more indications indicating one or more speech-time interval periods of the plurality of time interval periods of the particular portion as containing speech and one or more speech-free-time interval periods of the plurality of time interval periods as speech-free; receiving a desired content density comprehension index value associated with the user of the multimedia player, the desired content density comprehension index value representing a desired rate of content that the user has requested to comprehend; based, at least in part, on the content density index value for the particular portion and based, at least in part, on comparing the desired content density comprehension index value with the content density index value for the particular portion, determining a new speed for rendering at least a portion of the multimedia to match to the desired rate of content that the user has requested to comprehend; storing the new speed associated with the at least portion of the multimedia for rendering the at least portion of the multimedia at the new speed that is different from the particular speed.

11. The system of claim 10, wherein the at least portion of the multimedia is different from the particular portion, the particular portion being a lesser memory-sized copy of the at least portion of the multimedia, and the method further comprising:
prior to rendering the at least portion of the multimedia on the multimedia player, obtaining a lesser memory-sized copy of the multimedia, the lesser memory-sized copy of the multimedia having same content as the at least portion of the multimedia but a lesser memory size, the lesser memory-sized copy of the multimedia including the particular portion.

12. The system of claim 10, wherein determining the content density index value for the particular portion includes determining a speech density value for the particular portion, the speech density value indicating a density of lexical units within the particular portion.

13. A system comprising one or more processors and one or more storage media storing one or more computer programs for execution by the one or more processors, the one or more computer programs configured to perform a method comprising: receiving media data, wherein the media data is associated with multimedia to be rendered at a particular speed on a multimedia player on a computing device; determining a content density index value for a particular portion of the multimedia, the content density index value, representing a rate of content within the particular portion that a user of the multimedia player has to comprehend, at least, by determining whether each time interval period in a plurality of time interval periods of the particular portion contains speech, wherein the determining whether said each time interval period contains speech comprises: receiving voice-to-text textual data for the particular portion of the multimedia, or converting audio multimedia of the particular portion to the voice-to-text textual data, determining which respective segment of the voice-to-text textual data corresponds to said each time interval period in the plurality of time interval periods of the particular portion, based, at least in part, on existence of at least one lexical unit in the respective segment of the voice-to-text textual data that corresponds to said each time interval period, determining whether said each time interval period in the plurality of time interval periods of the particular portion contains speech, and generating one or more indications indicating one or more speech-time interval periods of the plurality of time interval periods of the particular portion as containing speech and one or more speech-free-time interval periods of the plurality of time interval periods as speech-free; based, at least in part, on the content density index value for the particular portion, determining a new speed for rendering at least a portion of the multimedia; storing the new speed associated with the at least portion of the multimedia for rendering the at least portion of the multimedia at the new speed that is different from the particular speed; determining a context-based density value for the particular portion at least by determining textual complexity of the voice-to-text textual data; wherein determining the new speed for rendering the at least portion of the multimedia, is further based, at least in part, on the context-based density value.

14. One or more non-transitory computer-readable media storing a set of instructions, wherein the set of instructions includes instructions, which, when executed by one or more processors, cause: receiving media data, wherein the media data is associated with multimedia to be rendered at a particular speed on a multimedia player on a computing device; determining a content density index value for a particular portion of the multimedia, the content density index value, representing a rate of content within the particular portion that a user of the multimedia player has to comprehend, at least, by determining whether each time interval period in a plurality of time interval periods of the particular portion contains speech, wherein the determining whether said each time interval period contains speech comprises: receiving voice-to-text textual data for the particular portion of the multimedia, or converting audio multimedia of the particular portion to the voice-to-text textual data, determining which respective segment of the voice-to-text textual data corresponds to said each time interval period in the plurality of time interval periods of the particular portion, based at least in part, on existence of at least one lexical unit in the respective segment of the voice-to-text textual data that corresponds to said each time interval period, determining whether said each time interval period in the plurality of time interval periods of the particular portion contains speech, and generating one or more indications indicating one or more speech-time interval periods of the plurality of time interval periods of the particular portion as containing speech and one or more speech-free-time interval periods of the plurality of time interval periods as speech-free; receiving a desired content density comprehension index value associated with the user of the multimedia player, the desired content density comprehension index value representing a desired rate of content that the user has requested to comprehend; based, at least in part, on the content density index value for the particular portion and based, at least in part, on comparing the desired content density comprehension index value with the content density index value for the particular portion, determining a new speed for rendering at least a portion of the multimedia to match to the desired rate of content that the user has requested to comprehend; storing the new speed associated with the at least portion of the multimedia for rendering the at least portion of the multimedia at the new speed that is different from the particular speed.

15. The one or more non-transitory computer-readable media of claim 14, wherein the set of instructions include instructions, which, when executed by one or more processors, further cause:
prior to rendering the at least portion of the multimedia on the multimedia player, obtaining a lesser memory-sized copy of the multimedia, the lesser memory-sized copy of the multimedia having same content as the at least portion of the multimedia but a lesser memory size, the lesser memory-sized copy of the multimedia including the particular portion.

16. The one or more non-transitory computer-readable media of claim 14, wherein determining the content density index value for the particular portion includes determining a speech density value for the particular portion, the speech density value indicating a density of lexical units within the particular portion.

17. One or more non-transitory computer-readable media storing a set of instructions, wherein the set of instructions includes instructions, which, when executed by one or more processors, cause: receiving media data, wherein the media data is associated with multimedia to be rendered at a particular speed on a multimedia player on a computing device; determining a content density index value for a particular portion of the multimedia, the content density index value, representing a rate of content within the particular portion that a user of the multimedia player has to comprehend, at least, by determining whether each time interval period in a plurality of time interval periods of the particular portion contains speech, wherein the determining whether said each time interval period contains speech comprises: receiving voice-to-text textual data for the particular portion of the multimedia, or converting audio multimedia of the particular portion to the voice-to-text textual data, determining which respective segment of the voice-to-text textual data corresponds to said each time interval period in the plurality of time interval periods of the particular portion, based at least in part, on existence of at least one lexical unit in the respective segment of the voice-to-text textual data that corresponds to said each time interval period, determining whether said each time interval period in the plurality of time interval periods of the particular portion contains speech, and generating one or more indications indicating one or more speech-time interval periods of the plurality of time interval periods of the particular portion as containing speech and one or more speech-free-time interval periods of the plurality of time interval periods as speech-free; based, at least in part, on the content density index value for the particular portion, determining a new speed for rendering at least a portion of the multimedia; storing the new speed associated with the at least portion of the multimedia for rendering the at least portion of the multimedia at the new speed that is different from the particular speed; determining a context-based density value for the particular portion at least by determining textual complexity of the voice-to-text textual data; wherein determining the new speed for rendering the at least portion of the multimedia, is further based, at least in part, on the context-based density value.

18. A computer-implemented method comprising: receiving media data, wherein the media data is associated with multimedia to be rendered at a particular speed on a multimedia player on a computing device; determining a content density index value for a particular portion of the multimedia, the content density index value, representing a rate of content within the particular portion that a user of the multimedia player has to comprehend, at least, by determining whether each time interval period in a plurality of time interval periods of the particular portion contains speech, wherein the determining whether said each time interval period contains speech comprises: receiving voice-to-text textual data for the particular portion of the multimedia, or converting audio multimedia of the particular portion to the voice-to-text textual data, determining which respective segment of the voice-to-text textual data corresponds to said each time interval period in the plurality of time interval periods of the particular portion, based, at least in part, on existence of at least one lexical unit in the respective segment of the voice-to-text textual data that corresponds to said each time interval period, determining whether said each time interval period in the plurality of time interval periods of the particular portion contains speech, and generating one or more indications indicating one or more speech-time interval periods of the plurality of time interval periods of the particular portion as containing speech and one or more speech-free-time interval periods of the plurality of time interval periods as speech-free; based, at least in part, on the content density index value for the particular portion, determining a new speed for rendering at least a portion of the multimedia; storing the new speed associated with the at least portion of the multimedia for rendering the at least portion of the multimedia at the new speed that is different from the particular speed; detecting a presence of one or more accents in audio media of the particular portion; determining a context-based density value for the particular portion based, at least in part, on the presence of the one or more accents.

\* \* \* \* \*